(12) United States Patent
Wallace et al.

(10) Patent No.: US 7,717,280 B2
(45) Date of Patent: May 18, 2010

(54) TWO-PIECE AFT CLOSURE FOR A ROCKET MOTOR CASE

(75) Inventors: William M. Wallace, Warrenton, VA (US); Michael T. Gagne, Gainesville, VA (US); Chester A. Copperthite, Amissville, VA (US)

(73) Assignee: Aerojet-General Corporation, Redmond, WA (US)

( * ) Notice: Subject to any disclaimer, the term of this patent is extended or adjusted under 35 U.S.C. 154(b) by 0 days.

(21) Appl. No.: 11/953,717

(22) Filed: Dec. 10, 2007

(65) Prior Publication Data
US 2008/0143058 A1    Jun. 19, 2008

Related U.S. Application Data

(60) Provisional application No. 60/869,876, filed on Dec. 13, 2006.

(51) Int. Cl.
*B65D 53/06* (2006.01)
*B65D 51/16* (2006.01)
*F16J 15/02* (2006.01)

(52) U.S. Cl. .................. 215/234; 220/367.1; 277/641
(58) Field of Classification Search .............. 215/234, 215/200; 60/246; D12/16.1; 220/310.1, 220/309.1
See application file for complete search history.

(56) References Cited

U.S. PATENT DOCUMENTS

| | | | | |
|---|---|---|---|---|
| 1,673,010 A | * | 6/1928 | Mauser | 220/319 |
| 1,732,235 A | * | 10/1929 | Joyce | 220/240 |
| 1,835,921 A | * | 12/1931 | Woodruff | 220/240 |
| 2,296,620 A | * | 9/1942 | Townsend | 220/328 |
| 2,459,201 A | * | 1/1949 | Thomas | 285/9.2 |
| 2,734,762 A | * | 2/1956 | Aleck | 292/256.6 |
| 2,995,009 A | * | 8/1961 | Rush | 60/721 |
| 3,046,026 A | * | 7/1962 | Burrows | 277/643 |
| 3,046,028 A | * | 7/1962 | Nathan | 277/605 |
| 3,070,254 A | * | 12/1962 | Carse et al. | 220/319 |
| 3,088,273 A | * | 5/1963 | Adelman et al. | 60/253 |
| 3,149,845 A | * | 9/1964 | Knox | 277/641 |
| 3,185,337 A | * | 5/1965 | Long | 220/233 |
| 3,223,427 A | * | 12/1965 | Gerard et al. | 277/441 |
| 3,224,191 A | * | 12/1965 | Bratton | 60/253 |

(Continued)

OTHER PUBLICATIONS

Gale, W.F. et al. "Smithells Metals Reference Book: Eighth Edition". Elsevier, Butterworth, Heinemann, Amsterdam, Jan. 2004, pp. 14-1 to 14-11.*

*Primary Examiner*—Anthony Stashick
*Assistant Examiner*—Robert J Hicks
(74) *Attorney, Agent, or Firm*—Christensen O'Connor Johnson Kindness PLLC

(57) ABSTRACT

An aft closure assembly manufactured from two separate and distinct pieces made from different materials is provided for a rocket motor case. The aft closure assembly includes at least a retaining ring piece made from a first material similar to or having a coefficient of thermal expansion similar to that of the motor case. The aft closure assembly includes a blast tube and closure piece that can be manufactured from a second material that does not need to be similar to nor have a coefficient of thermal expansion similar to the motor case and retaining ring piece. This is possible because the blast tube and closure piece includes a face seal that seals against a face of the retaining ring.

28 Claims, 15 Drawing Sheets

U.S. PATENT DOCUMENTS

| | | | | |
|---|---|---|---|---|
| 3,315,836 A * | 4/1967 | Boon | ............... | 220/328 |
| 3,329,447 A * | 7/1967 | Hitz | ............... | 285/113 |
| 3,570,768 A * | 3/1971 | Conway et al. | ............... | 239/265.35 |
| 3,659,789 A * | 5/1972 | Schultz | ............... | 239/265.19 |
| 3,699,893 A * | 10/1972 | Meraz et al. | ............... | 102/262 |
| 3,897,874 A * | 8/1975 | Coons | ............... | 206/315.9 |
| 4,108,327 A * | 8/1978 | Shonerd et al. | ............... | 220/581 |
| 4,213,393 A * | 7/1980 | Gunners et al. | ............... | 102/374 |
| 4,311,317 A * | 1/1982 | Bartels | ............... | 220/304 |
| 4,337,954 A * | 7/1982 | Backlin et al. | ............... | 277/571 |
| 4,358,022 A * | 11/1982 | Geiger | ............... | 215/224 |
| 5,542,333 A * | 8/1996 | Hagelberg et al. | ............... | 89/1.81 |
| 5,792,981 A * | 8/1998 | Singer et al. | ............... | 102/481 |
| 5,839,765 A * | 11/1998 | Carter et al. | ............... | 285/334.2 |
| 6,343,709 B1 * | 2/2002 | DeForrest et al. | ............... | 220/327 |
| 6,361,049 B1 * | 3/2002 | Joco | ............... | 277/312 |
| 2003/0194943 A1 * | 10/2003 | Rowley et al. | ............... | 446/52 |
| 2006/0278633 A1 * | 12/2006 | Cacace | ............... | 220/4.12 |
| 2007/0013147 A1 * | 1/2007 | Granquist | ............... | 277/632 |
| 2007/0039968 A1 * | 2/2007 | Ting et al. | ............... | 220/582 |

* cited by examiner

TWO-PIECE AFT CLOSURE FOR A ROCKET MOTOR CASE

CROSS-REFERENCE TO RELATED APPLICATION

This application claims the benefit of U.S. Provisional Application No. 60/869,876, filed on Dec. 13, 2006, incorporated herein expressly by reference in its entirety.

FIELD OF THE INVENTION

The present disclosure relates to an end closure for a pressure vessel and more specifically, to a two-piece aft closure assembly for a rocket motor case.

BACKGROUND

A typical rocket motor has a pressure vessel (motor case) and a nozzle. The motor case contains the propellant. In typical rocket motor configurations, the nozzle and nozzle components are housed in an aft closure. In addition to holding the nozzle and nozzle components, the aft closure also seals an end of the motor case so that the seal is able to withstand the pressure generated inside the rocket motor case. To meet this goal, the aft closure is made from a single piece of material. FIG. 1 illustrates a prior art aft closure 100 with blast tube 102. The aft closure 100 is made from a single (i.e., a monolithic) piece of material. The aft closure 100 is connected to the blast tube 102 either by being milled from the same piece of material as the aft closure, or alternatively, the blast tube 102 is E-beam welded to the aft closure 100. The cylindrical wall 104 exterior seals against the inside surface of the motor case. To this end, the cylindrical wall 104 includes a groove 106 for an O-ring (not shown).

Because tactical rocket motors are designed to perform over a broad range of temperatures (e.g., −65° F. to 160° F.), the motor case and aft closure 100 are typically made from materials having similar coefficients of thermal expansion (CTE). Using the same materials or materials with similar coefficients of thermal expansion are necessary to reduce leaks between the motor case and the aft closure 100.

Ideally, the motor case and aft closure are manufactured from the same material. Titanium is a common material used for the motor case because of its relatively high strength to weight ratio. Minimizing the amount of material is also a design consideration, making the use of high-strength, low-weight materials, such as titanium, an attractive option for the closure 100 as well. Manufacturing the aft closure 100 from titanium reduces the mass of the closure, but also has inherent disadvantages. For example, the cost of the raw material is much higher for titanium than steel or aluminum. Also, an aft closure 100 has intricate details that are difficult to produce in a single piece of titanium, leading to expensive manufacturing processes.

On the other hand, avoiding a titanium aft closure 100 and manufacturing the aft closure 100 from a light, inexpensive, easily machined material, such as aluminum, has other disadvantages. For example, aluminum has a high coefficient of thermal expansion as compared to materials used for the motor case. Consequently, extremes in temperature will create potential leak conditions. Further, aluminum has a lower strength than steel or titanium, requiring more mass to achieve similar strength as titanium.

SUMMARY

To solve the aforementioned problems with aft closures, one embodiment of the invention provides an aft closure assembly manufactured from two separate and distinct pieces made from different materials. The aft closure assembly includes a retaining ring piece made from a first material similar to or having a coefficient of thermal expansion similar to that of the motor case. The aft closure assembly also includes a blast tube and closure piece that can be manufactured from a second material that does not need to be similar to, nor have a coefficient of thermal expansion similar to the motor case and retaining ring piece. This is possible because of the sealing system provided. The sealing system has a first seal between the retaining ring piece and the motor case and a second seal that is orthogonal to the first seal. The second seal is provided at the blast tube and closure piece and includes a face seal that seals the blast tube and closure piece against the end surface of the retaining ring piece.

The sealing system having a first and a second seal that are orthogonal to each other is suitable to be used in pressure vessels, such as rocket engine motor cases and other applications where different materials are used for the pressure vessel and the closure at one end of the vessel, or in applications where extremes in temperature are experienced.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
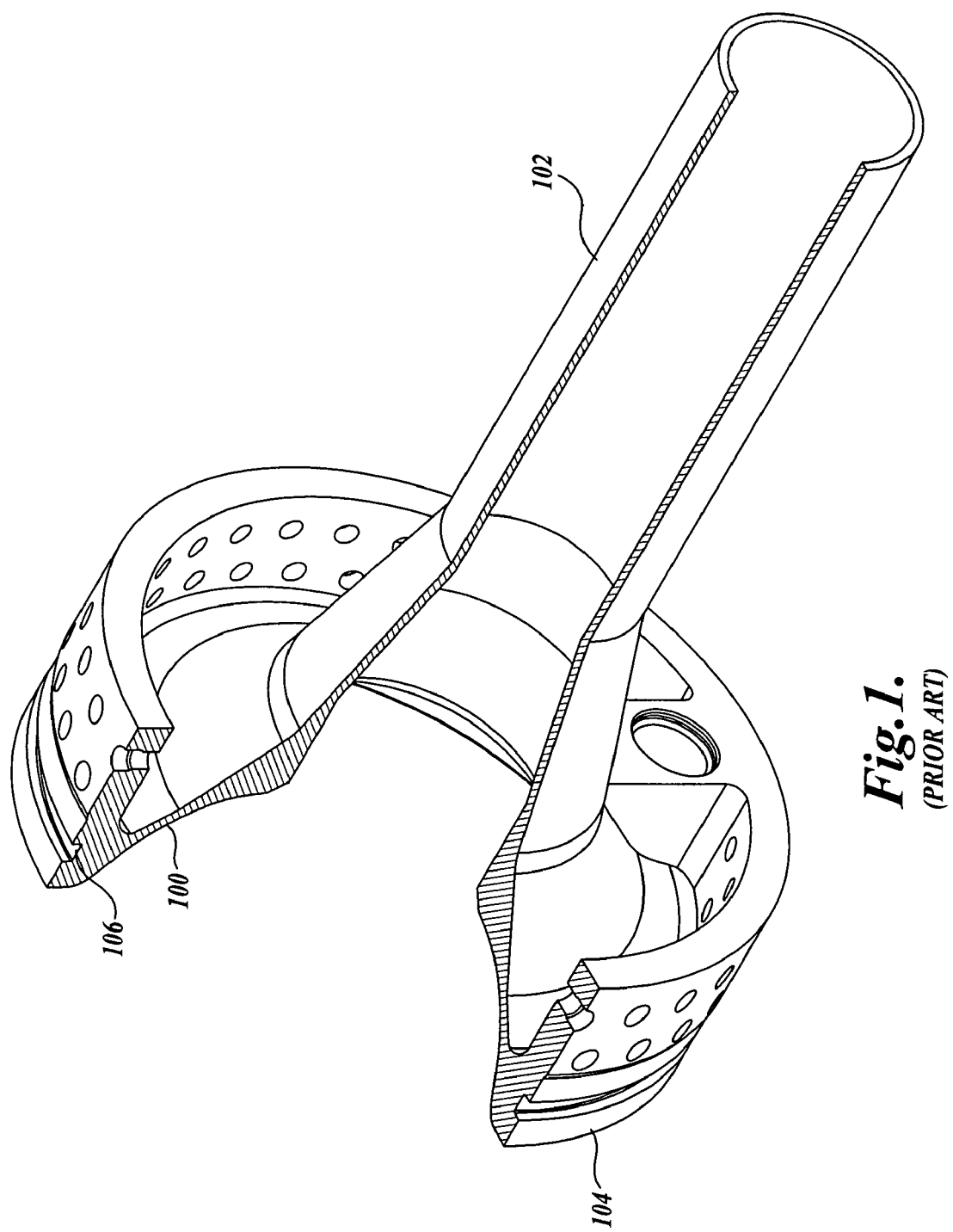
FIG. 1 is an isometric cutaway rear view illustration of a previously known aft closure.
Figure 2:
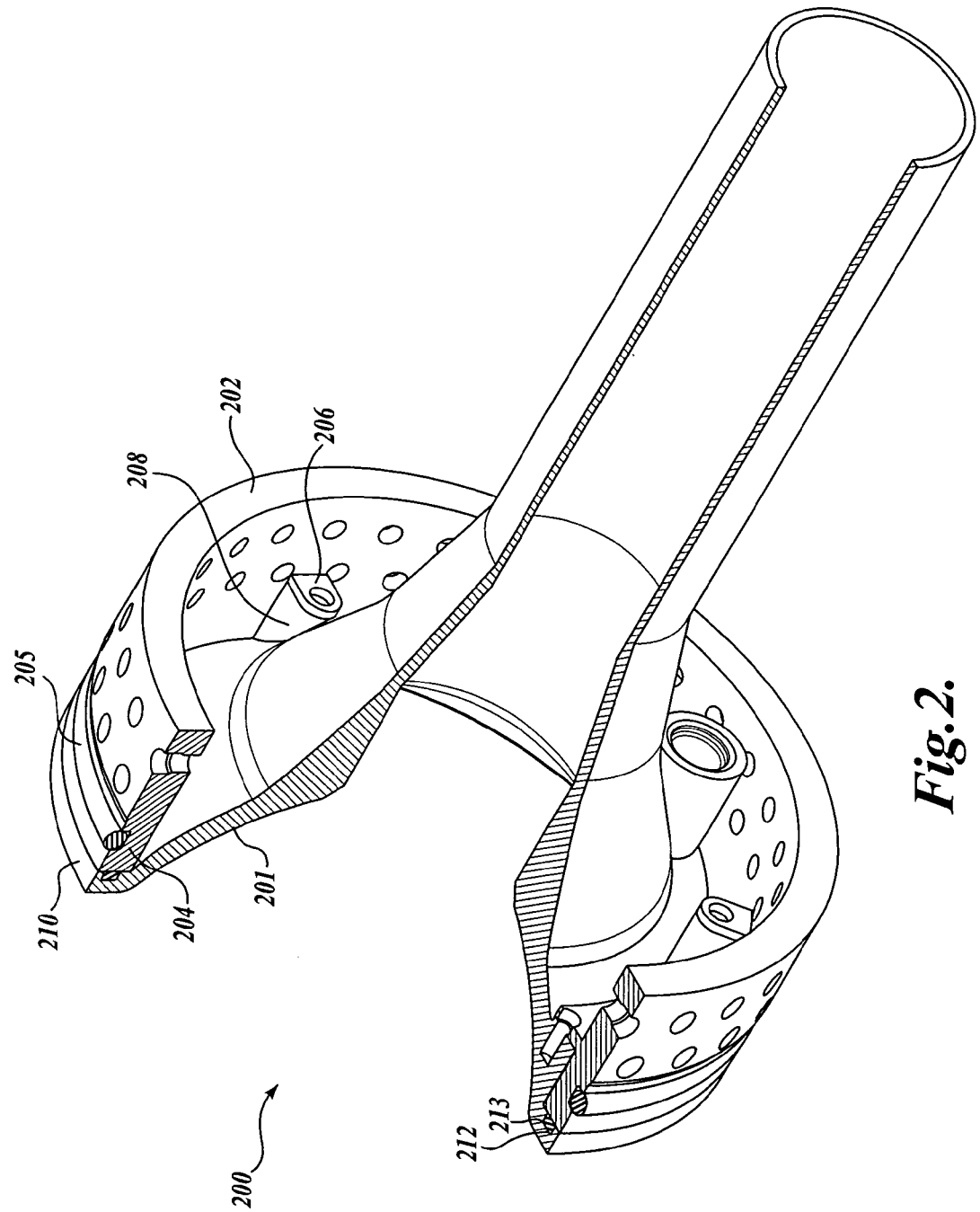
FIG. 2 is an isometric cutaway rear view illustration of a two-piece aft closure assembly constructed in accordance with a first embodiment of the present disclosure.
Figure 3:
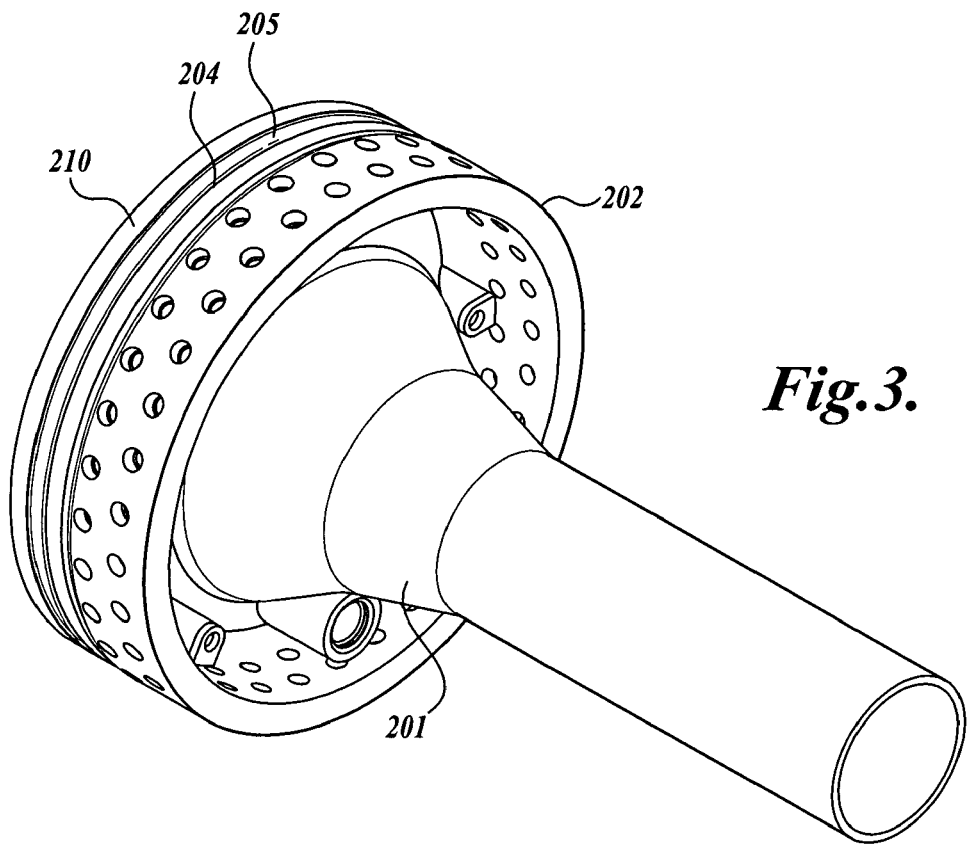
FIG. 3 is an isometric rear view illustration of the two-piece aft closure assembly shown in FIG. 2.
Figure 4:
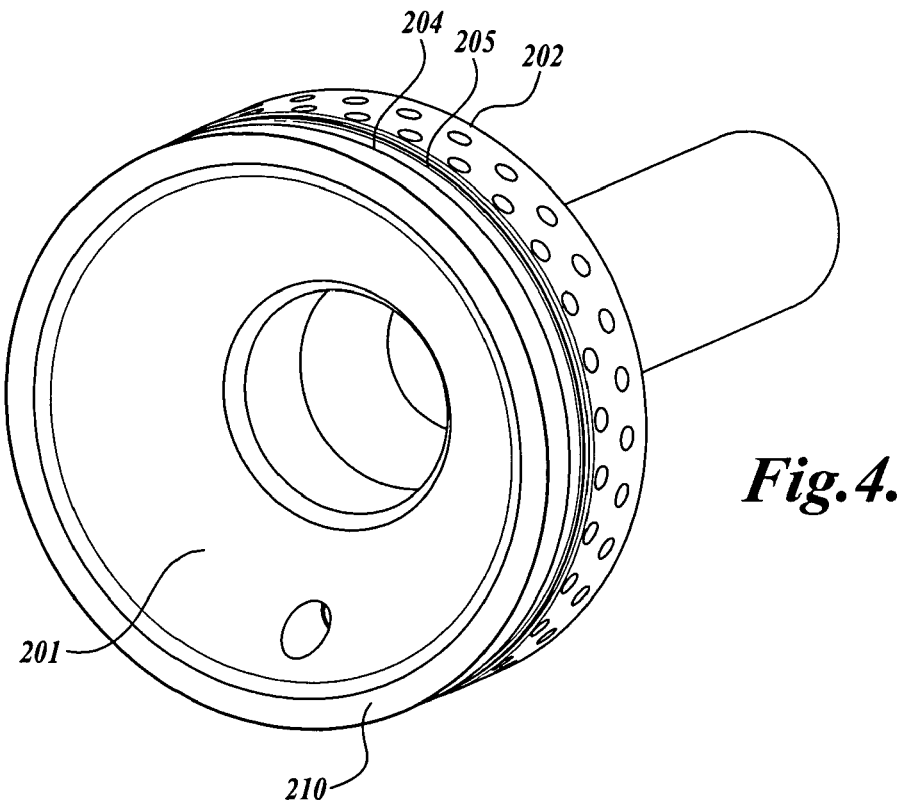
FIG. 4 is an isometric front view illustration of the two-piece aft closure assembly shown in FIG. 2.
Figure 5:
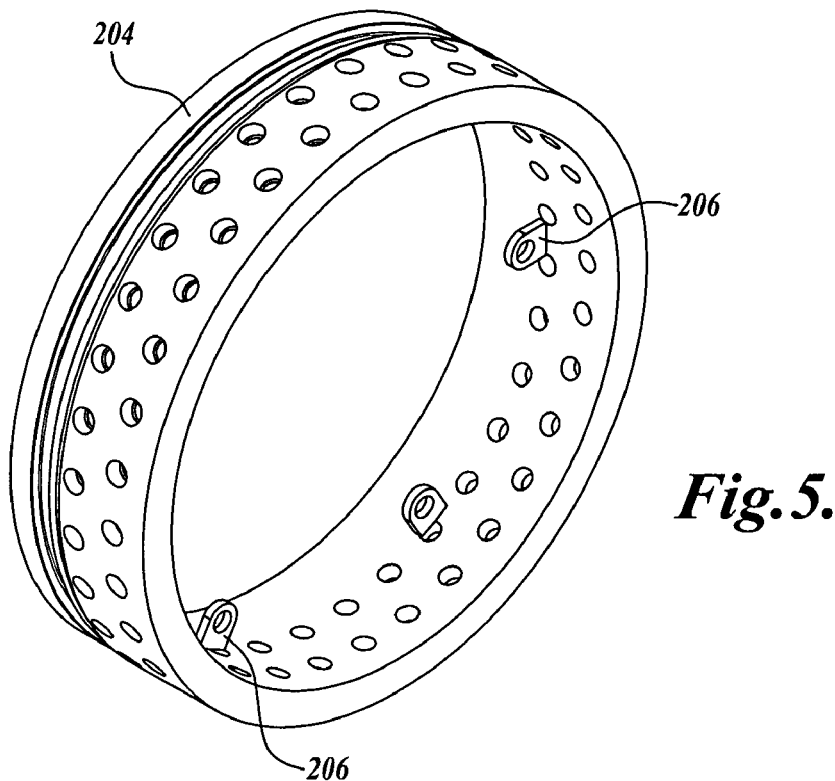
FIG. 5 is an isometric rear view illustration of the retaining ring piece of the two-piece aft closure assembly shown in FIG. 2.
Figure 6:
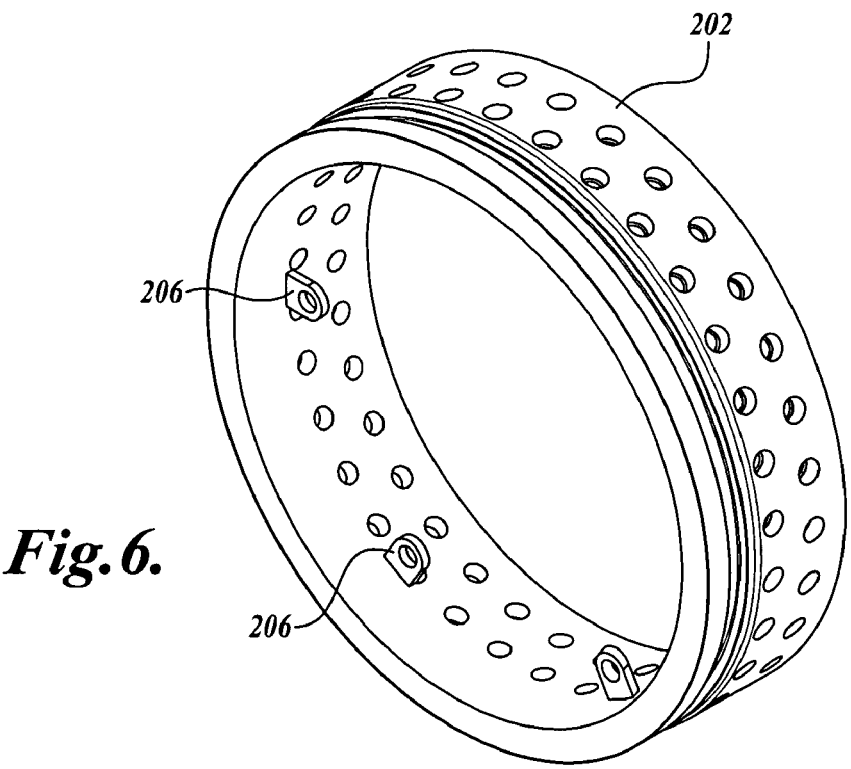
FIG. 6 is an isometric front view illustration of the retaining ring piece of the two-piece aft closure assembly shown in FIG. 2.
Figure 7:
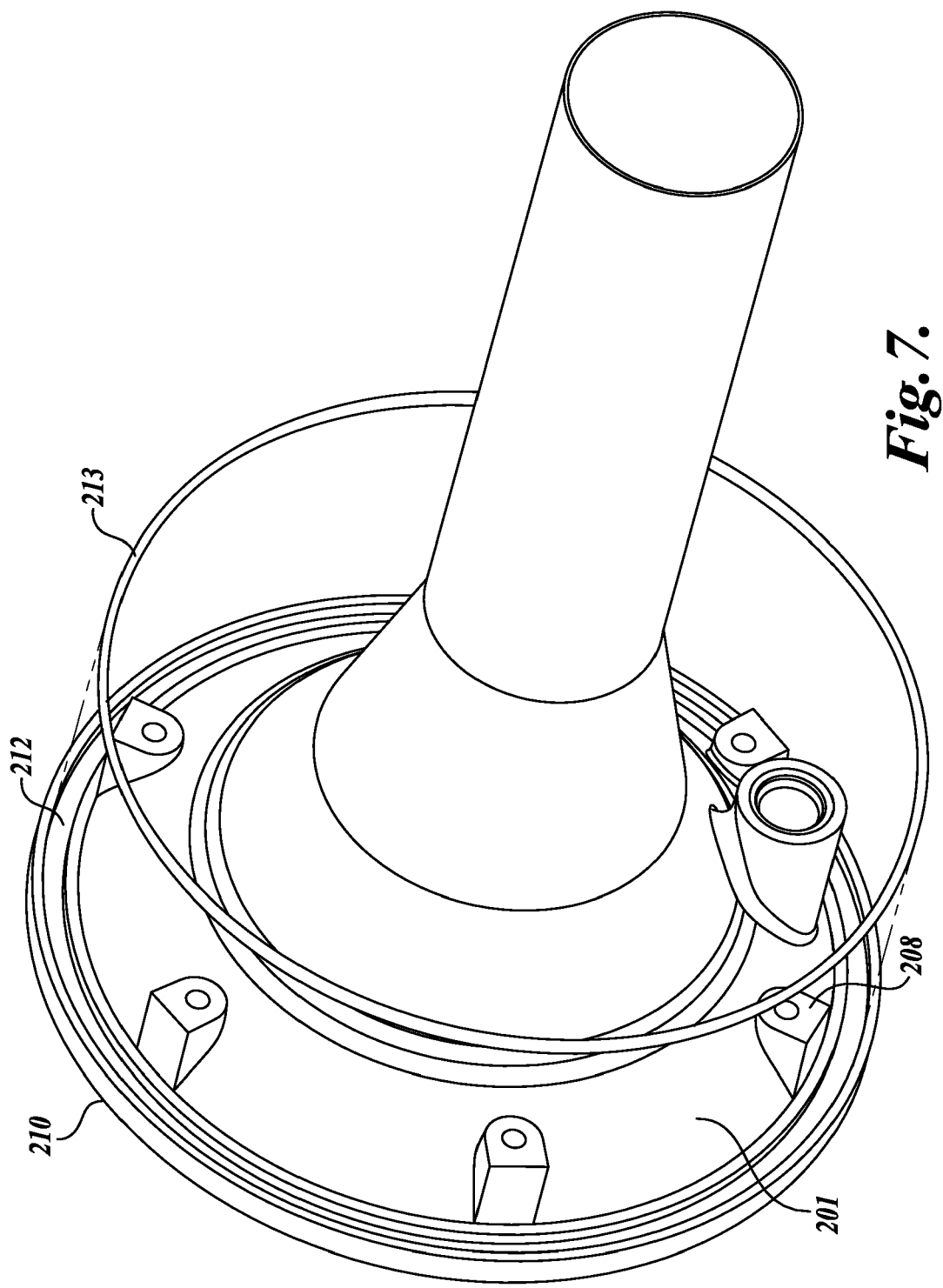
FIG. 7 is an isometric rear view illustration of the blast tube and closure piece of the two-piece aft closure assembly shown in FIG. 2.
Figure 8:
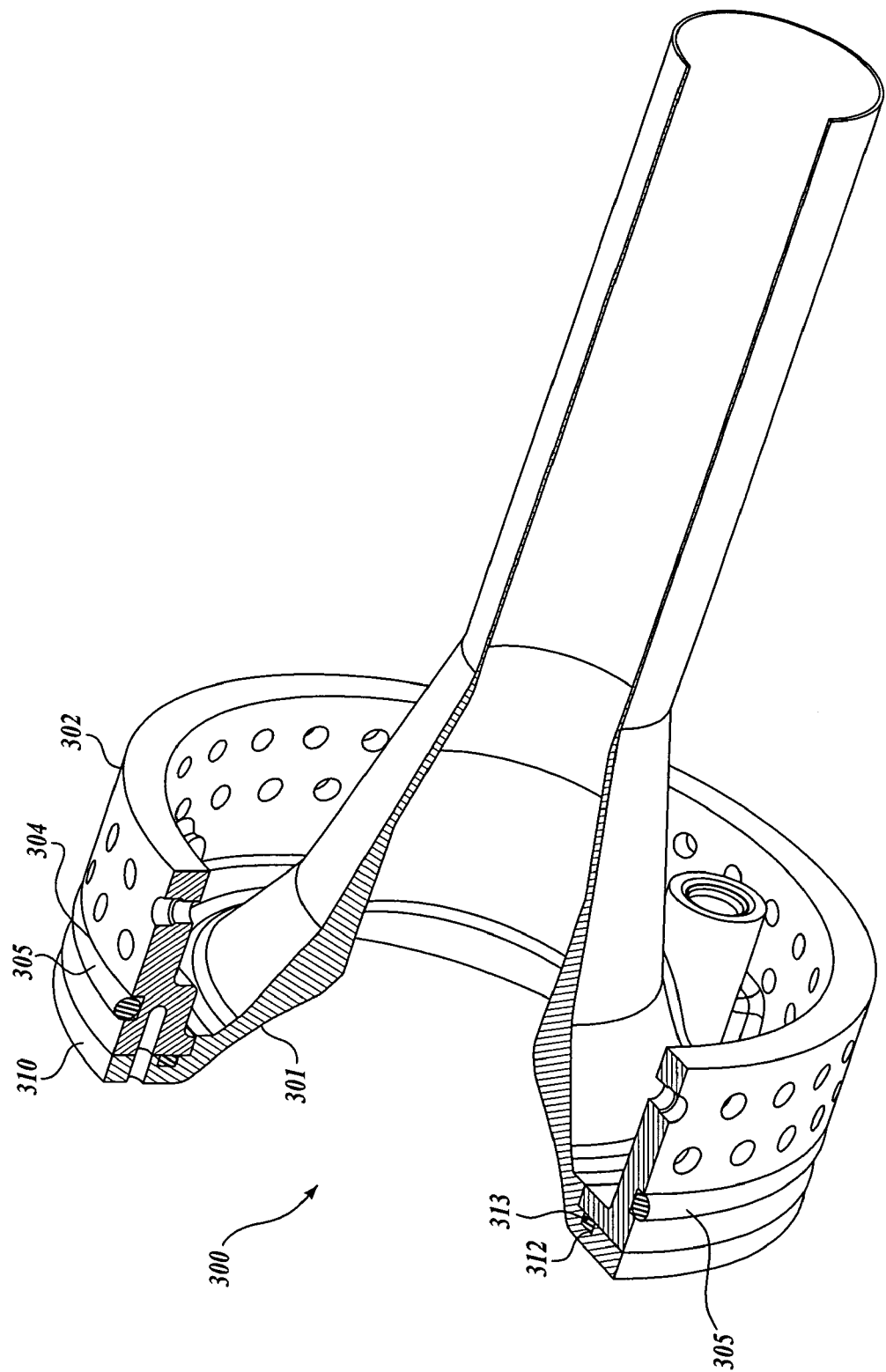
FIG. 8 is an isometric cutaway rear view illustration of a two-piece aft closure assembly constructed in accordance with a second embodiment of the present disclosure.
Figure 9:
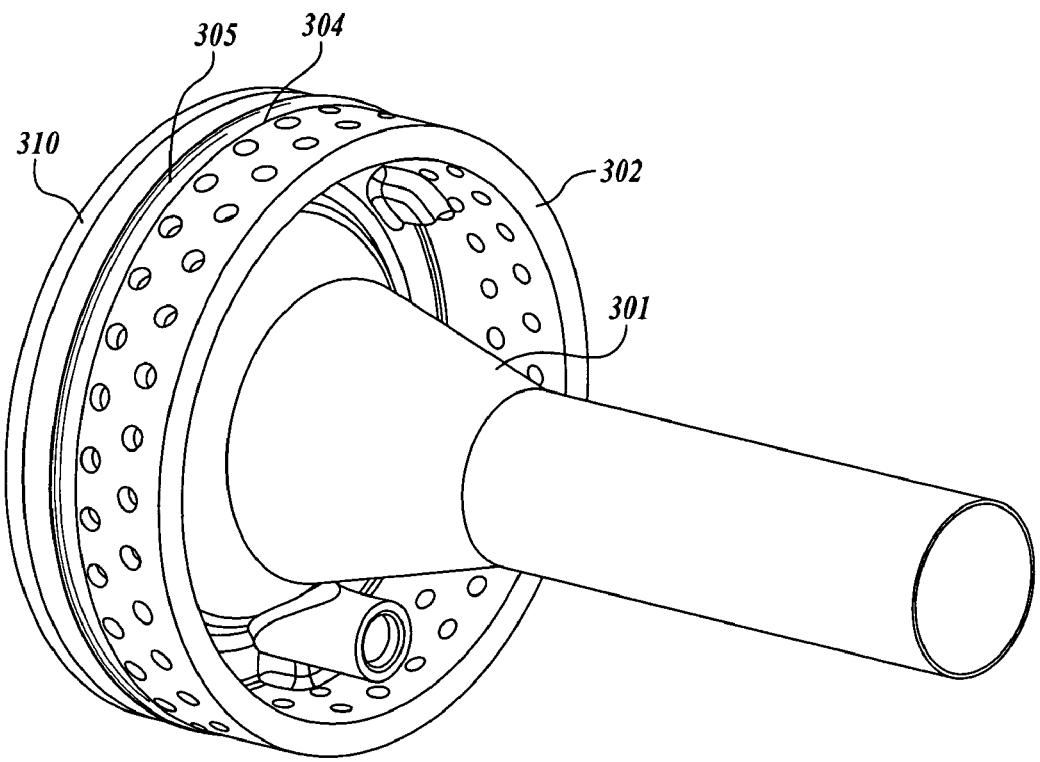
FIG. 9 is an isometric rear view illustration of the two-piece aft closure assembly shown in FIG. 8.
Figure 10:
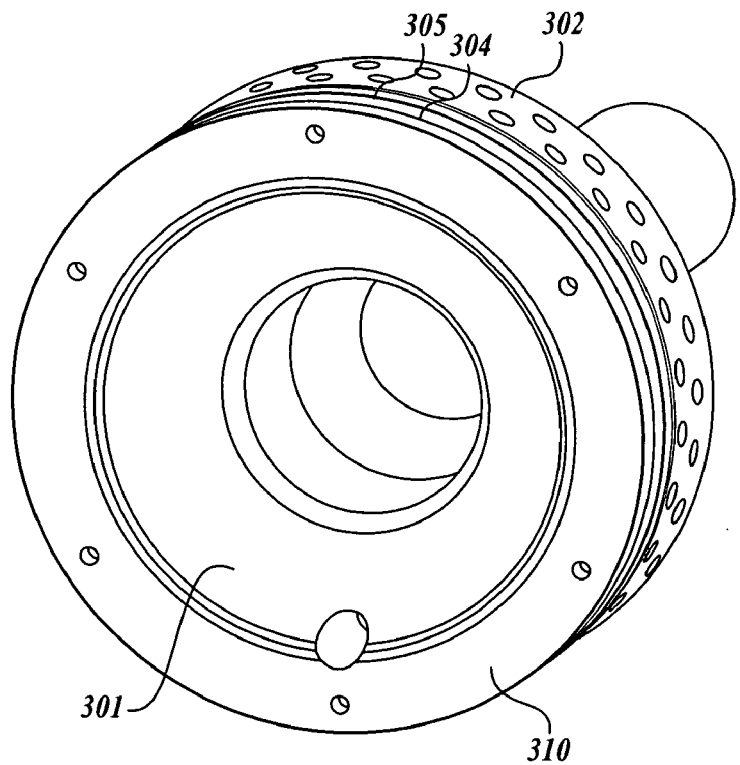
FIG. 10 is an isometric front view illustration of the two-piece aft closure assembly shown in FIG. 8.
Figure 11:
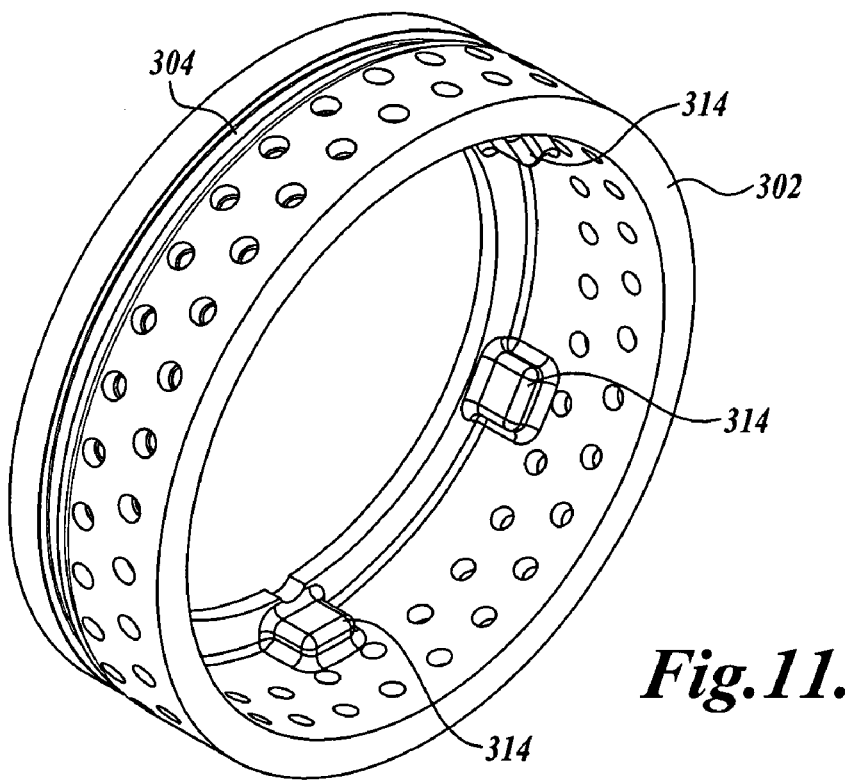
FIG. 11 is an isometric rear view illustration of the retaining ring piece of the two-piece aft closure assembly shown in FIG. 8.
Figure 12:
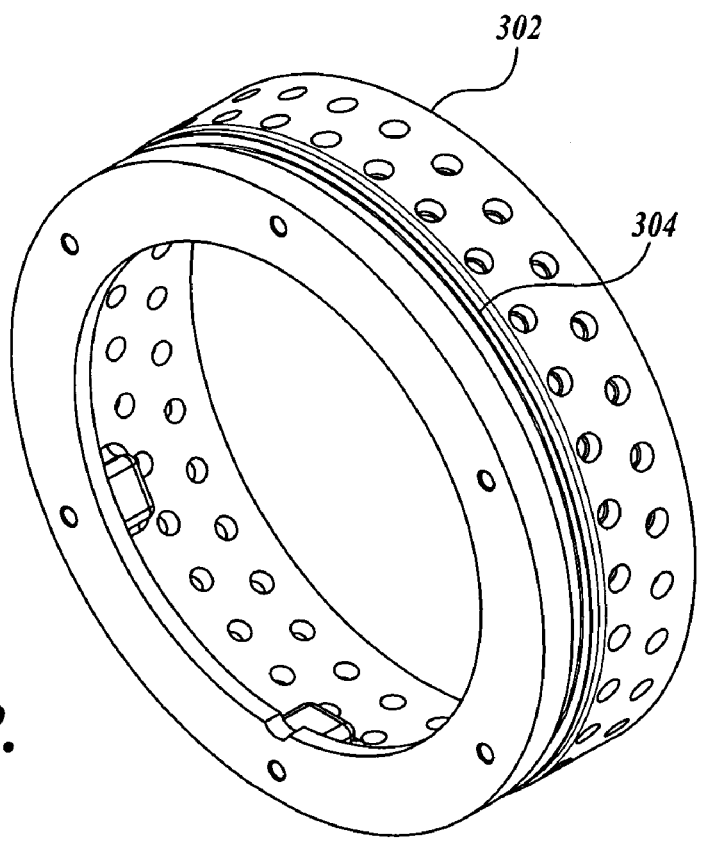
FIG. 12 is an isometric front view illustration of the retaining ring piece of the two-piece aft closure assembly shown in FIG. 8.
Figure 13:
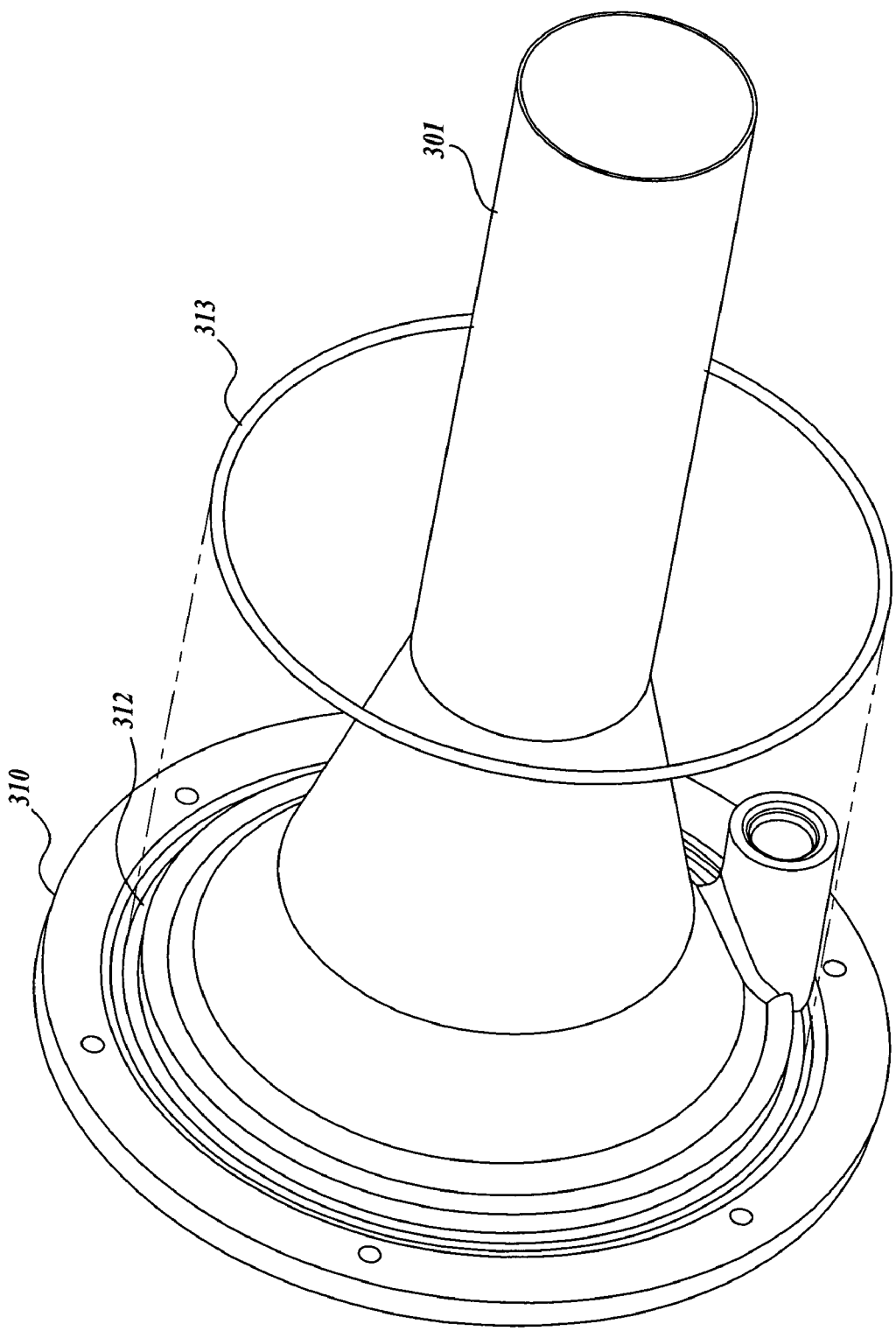
FIG. 13 is an isometric rear view illustration of the blast tube and closure piece of the two-piece aft closure assembly shown in FIG. 8.
Figure 14:
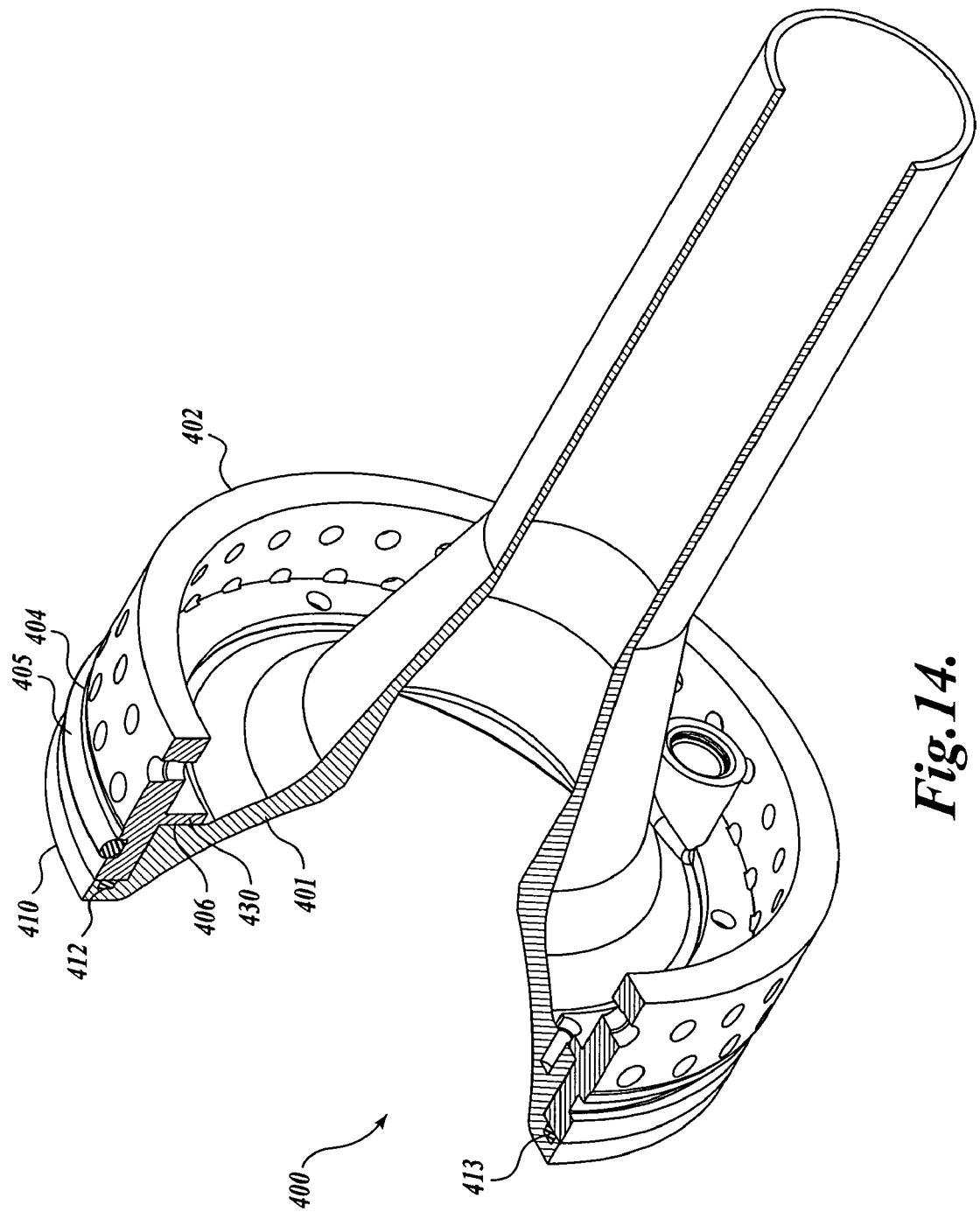
FIG. 14 is an isometric cutaway rear view illustration of a two-piece aft closure assembly constructed in accordance with a third embodiment of the present disclosure.
Figure 15:
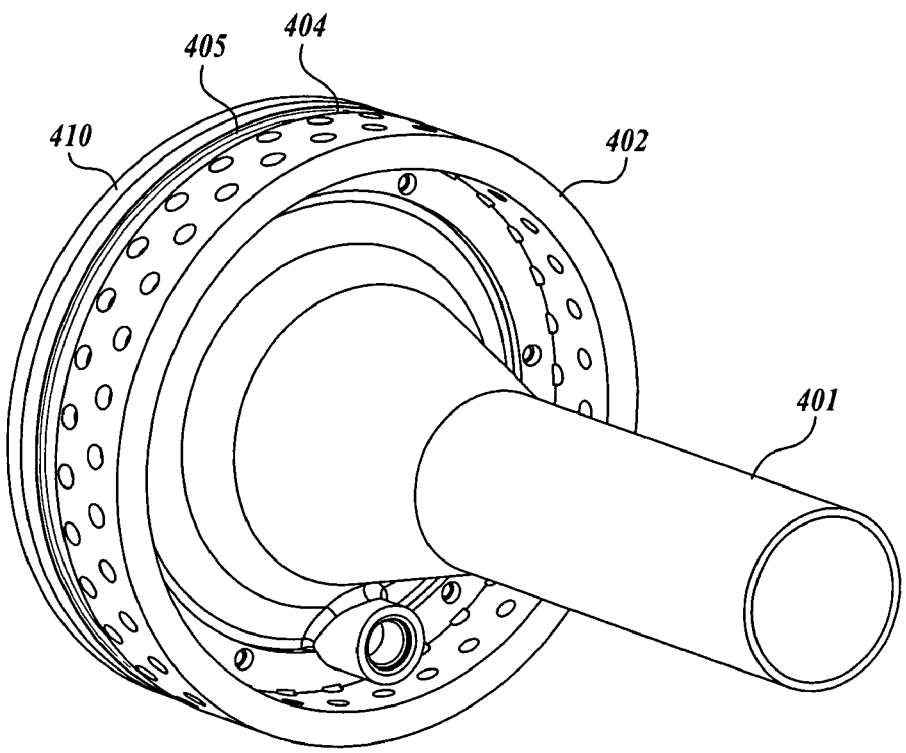
FIG. 15 is an isometric rear view illustration of the two-piece aft closure assembly shown in FIG. 14.
Figure 16:
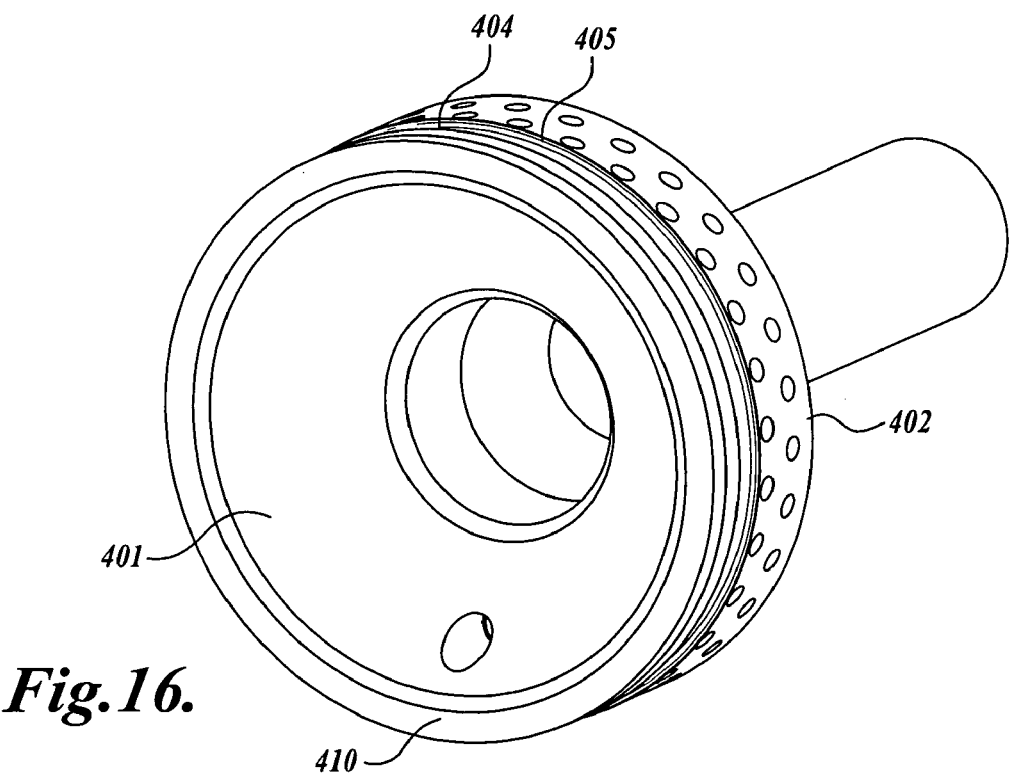
FIG. 16 is an isometric front view illustration of the two-piece aft closure assembly shown in FIG. 14.
Figure 17:
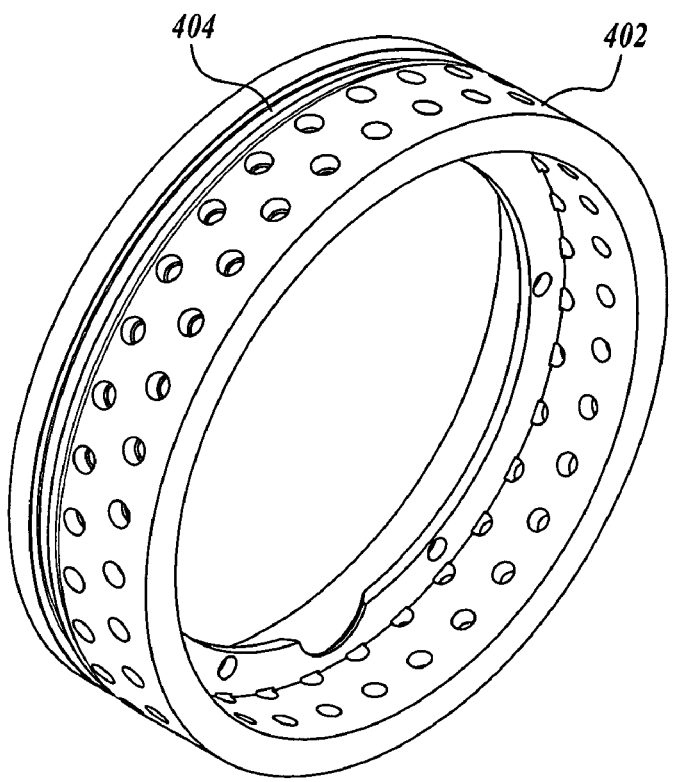
FIG. 17 is an isometric rear view illustration of the retaining ring piece of the two-piece aft closure assembly shown in FIG. 14.
Figure 18:
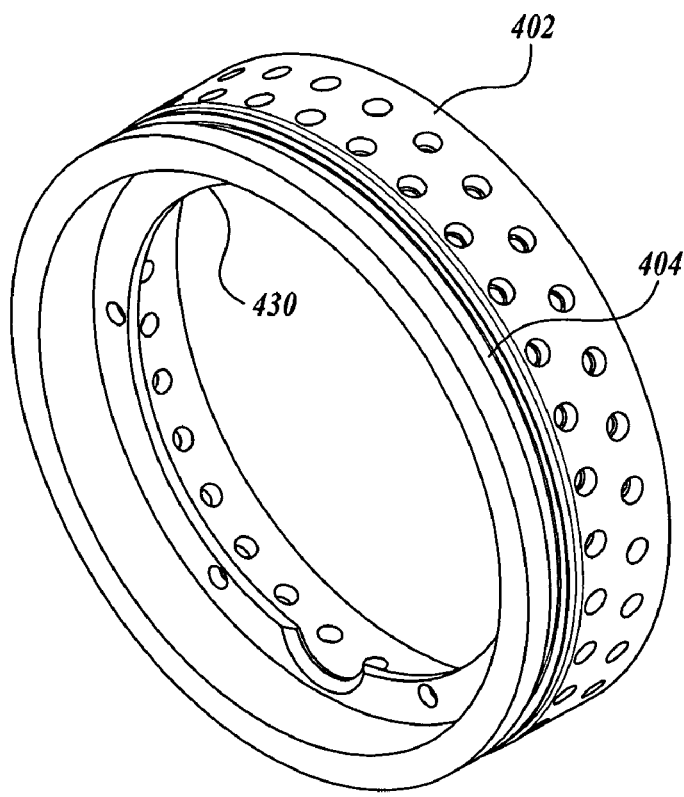
FIG. 18 is an isometric front view illustration of the retaining ring piece of the two-piece aft closure assembly shown in FIG. 14.
Figure 19:
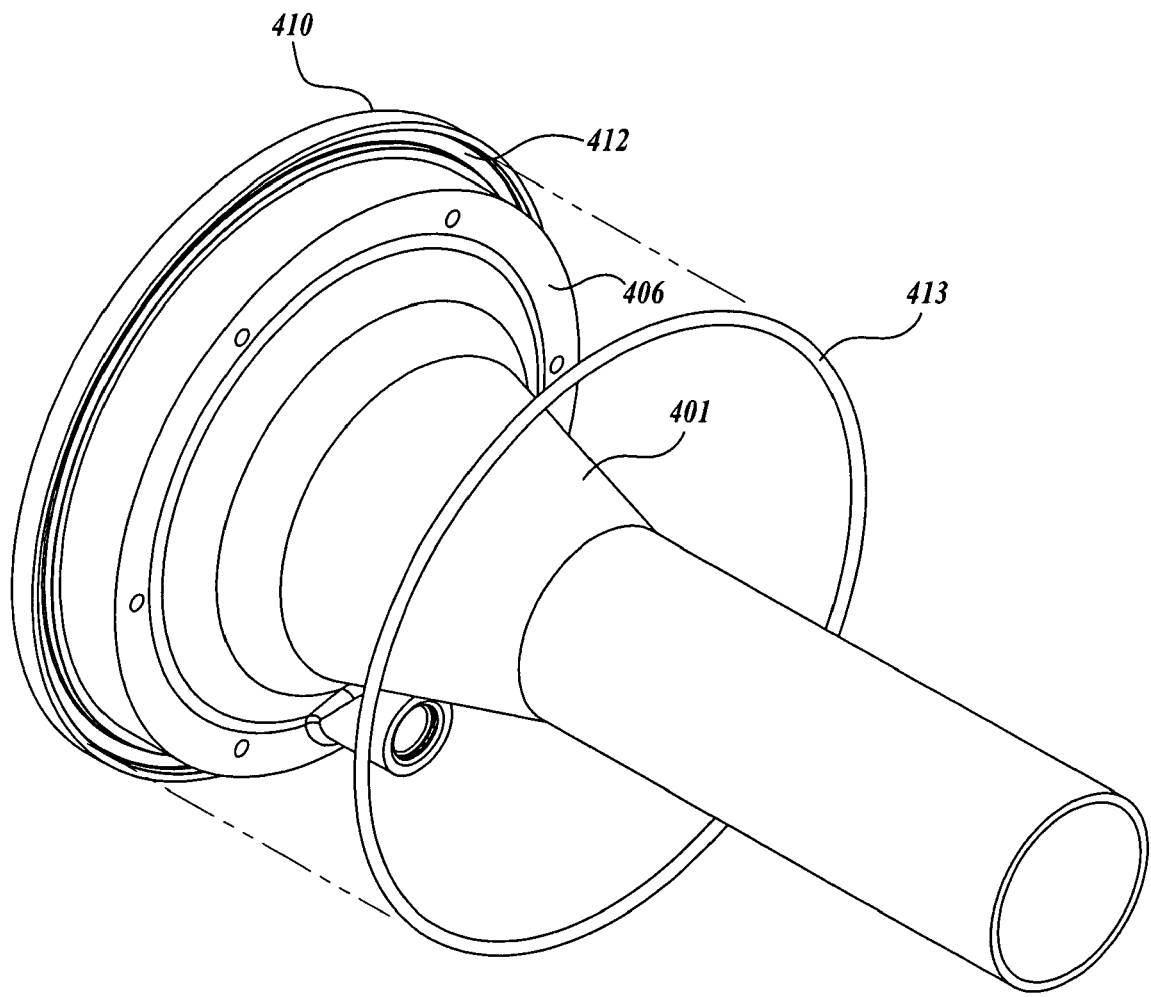
FIG. 19 is an isometric rear view illustration of the blast tube and closure piece of the two-piece aft closure assembly shown in FIG. 14.

FIGS. 2-7 illustrate a first embodiment of a two-piece aft closure assembly 200 for a motor case utilizing a specialized sealing system that allows a separate and distinct blast tube and closure piece 201 and a retaining ring piece 202. The two-piece aft closure assembly 200 includes a retaining ring piece 202 and a blast tube and closure piece 201. The blast tube and closure piece 201 seals to the retaining ring piece 202 which seals the motor case, however, the motor case is open to the exterior via the blast tube. The blast tube and closure piece 201 may be made from a single material and includes the closure portion and the blast tube portion. The closure portion includes that portion which is about as wide as the inner diameter of the motor case and which gradually reduces in diameter to the diameter of the blast tube. The blast tube is an elongated cylinder of generally equal diameter along its length extending from the end of the closure portion. However, other embodiments of the blast tube may be conical or tapered, and either be diverging or converging. Furthermore, the wall thickness of the blast tube may vary throughout its length.

The retaining ring piece 202 generally has a short cylindrical body, wherein the length is generally greater than the thickness. The thickness of the retaining ring piece 202 is defined as the difference between the inner and outer diameters. The proximal and distal ends of the retaining ring piece 202 (shown, respectively, in FIG. 6 and FIG. 5) define a flat surface resembling an annulus. The retaining ring piece 202 has a groove 204 on its outer periphery nearer to the proximal end (facing the motor case) that accepts an O-ring seal 205 (the radial seal) to seal against the inside circumference of the motor case (not shown). The proximal end of the retaining ring piece 202 is sealed against the blast tube and closure piece 201 at the end face and is sealed by a second seal 213 orthogonal to the first or radial seal 205. Representative materials out of which the O-ring 205 can be made, include, but are not limited to butyl rubber, nitrile rubber, a fluorocarbon, ethylene propylene diene monomer rubber, a silicone, a fluorosilicone, adhesives, or any combination of the above. The retaining ring piece 202 is made from a material similar to the material used for making the motor case. Alternatively, the retaining ring piece 202 is made from a material that has a coefficient of thermal expansion similar to the coefficient of thermal expansion of the motor case. In preferred embodiments, the retaining ring piece 202 is made from steel, titanium, alloys of steel, alloys of titanium, or combinations thereof. The retaining ring piece 202 includes a plurality of bolt holes around the circumference of the retaining ring piece 202 to attach the retaining ring piece 202 to the motor case via a plurality of bolts around the circumference of the retaining ring piece 202. The retaining ring piece 202 may be fixed to the motor case via other means including, but not limited to adhesives, retention rings, such as TRUARC rings, circlips, and the like, ORTMAN keys, rivets, or any combination of the above, Additionally, the retaining ring piece 202 includes means for attaching the retaining ring piece 202 to the closure portion of the blast tube and closure piece 201. One embodiment of a means for attaching the retaining ring piece 202 to the blast tube and closure piece 201 is via a plurality of discrete retention tabs 206 with bolt holes spaced evenly around the inside circumference of the retaining ring piece 202. The bolt holes in the retention tabs 206 may be slotted to allow for differences in the coefficient of thermal expansion of the retaining ring piece 202 and the blast tube and closure piece 201. Each retention tab 206 is attached to the inside circumference of the retaining ring piece 202. The blast tube and closure piece 201 includes corresponding bosses 208 with holes to mate with the retention tabs 206 on the retaining ring piece 202. Another embodiment of a means for attaching the retaining ring piece to the closure portion of the blast tube and closure piece 201 is a continuous lip with holes on the inside circumference of the retaining ring piece. The holes of either embodiment are provided for bolting the retaining ring piece to the blast tube and closure piece.

The blast tube and closure piece 201 has a closure portion and a blast tube portion integrally connected to each other at a transition section. The closure portion has a flange 210 around the circumference at the proximal end thereof. The flange 210 includes a groove 212 on the distal face of the flange 210 or side facing the retaining ring piece 202 to support the O-ring 213 (the face seal O-ring) that seals against the retaining ring piece 202, and in particular, against the thickness dimension of the retaining ring piece 202. Representative materials out of which the face seal O-ring 213 can be made, include, but are not limited to butyl rubber, nitrile rubber, a fluorocarbon, ethylene propylene diene monomer rubber, a silicone, a fluorosilicone, or any combination of the above. The flange 210 has an inner and outer diameter that generally match the dimensions of the inner and outer diameter of the retaining ring piece 202. From the flange 210, the closure portion gradually decreases in inner and outer diameter to generally form a funnel or cone shape that eventually results in a diameter that matches the diameter of the blast tube portion and is the beginning of the blast tube. The reduction in inner and outer diameters need not be constant, so that in one embodiment, the closure portion may have a constant reduction in the outer diameter and have a varying reduction in the inside diameter, so that "steps" or constant inner diameter sections may be provided on the inside of the closure portion. The blast tube portion may have a constant inside and outside diameter and is generally longer than the closure section. However, the blast tube may be conical or tapered, and either be diverging or converging. Furthermore, the thickness may vary throughout the length.

The blast tube and closure piece 201 is made from a material that can be different than the material of both the retaining ring piece 202 and the motor case. Alternatively, the blast tube and closure piece 201 can be made from a material having a different coefficient of thermal expansion than the coefficient of thermal expansion of both the retaining ring piece 202 and the motor case. Additionally, the blast tube and closure piece 201 can be made from a material that is easier to machine than either of the materials for the retaining ring piece 202 and the motor case. In preferred embodiments, the blast tube and closure piece 201 is made from aluminum, alloys of aluminum, and combinations thereof. Alternatively, the blast tube and closure piece 201 is made from a material that is lighter in weight as compared to the materials from which both the retaining ring piece 202 and the motor case are manufactured.

FIGS. 8 through 13 illustrate a second embodiment of a two-piece aft closure assembly 300. The second embodiment is substantially similar to the first embodiment discussed in association with FIGS. 2-7. As in the first embodiment, the retaining ring piece 302 has a groove 304 on its outer periphery nearer to the proximal end that accepts an O-ring seal 305 (the radial seal) to seal against the inside circumference of the motor case (not shown). The second embodiment of the two-piece aft closure assembly 300 includes bolts to attach the retaining ring piece 302 to the blast tube and closure piece 301, wherein the bolts are threaded from the proximal side of the flange 310 of the blast tube and closure piece 301. To accommodate the bolts, the retaining ring piece 302 has a greater thickness dimension at the proximal end than at the distal end so that bolt holes can be provided at the proximal face of the retaining ring piece 302. The flange 310 then substantially matches the greater thickness of the proximal end of the retaining ring piece 302. The retaining ring piece 302 includes bosses 314 spaced evenly around the inside circumference and immediately distal to the face end to accommodate bolt holes. This allows the flange 310 and the proximal end of the retaining ring 302 to attach the blast tube and closure piece 301 to the retaining ring piece 302. The flange 310 on the closure portion includes a groove 312 on the distal side of the flange 310 to accommodate a face seal O-ring 313. The face seal O-ring 313 is provided on the flange 310 at a smaller radius than the bolt holes.

FIGS. 14 through 19 illustrate a third embodiment of a two-piece aft closure assembly 400. The third embodiment of the two-piece aft closure assembly is similar to the first embodiment described in association with FIGS. 2-7 and to the second embodiment described in association with FIGS. 8-13. As in the first and second embodiments, the retaining ring piece 402 has a groove 404 on its outer periphery nearer to the proximal end that accepts an O-ring seal 405 (the radial seal) to seal against the inside circumference of the motor case (not shown). However, the third embodiment utilizes a continuous or full ring 430 on the inner circumference of the retaining ring piece 402 as the means for connecting the retaining ring piece 402 to the blast tube and closure piece 401. The continuous ring 430 includes evenly-spaced bolt holes. The blast tube and closure piece 401 includes a ledge 406 against which the proximal side of the ring 430 abuts against. The ledge 406 includes bolt holes that match with bolt holes on the ring 430. The retaining ring piece 402 can thus be attached to the blast tube and closure piece 401 at the continuous ring 430 with bolts. The bolts provide for preloading the face seal O-ring 413 between the retaining ring piece 402 and blast tube and closure piece 401.

Figure 20:
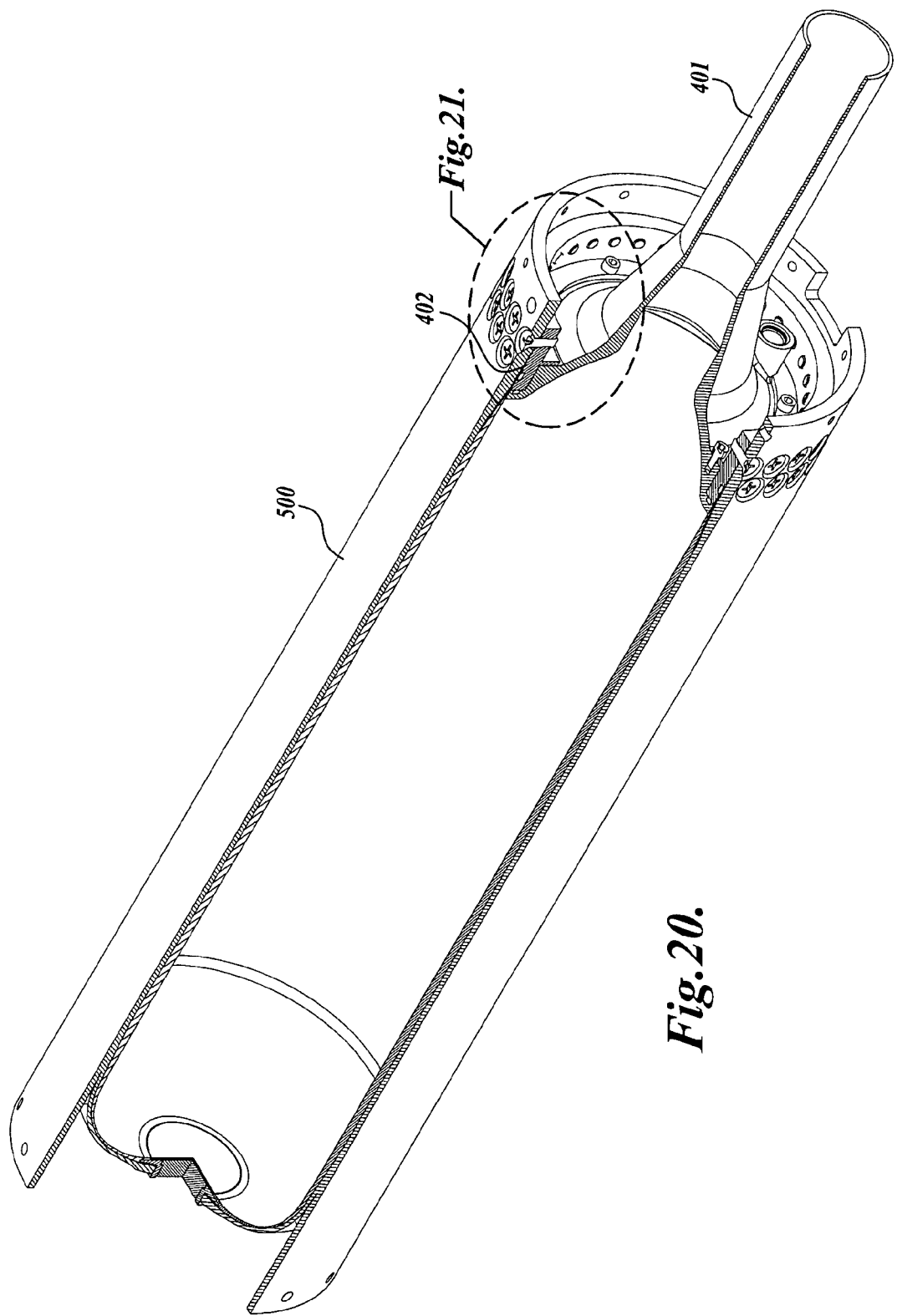
FIG. 20 is an isometric cutaway rear view illustration of the two-piece aft closure assembly of FIG. 14 installed in a motor case.
Figure 21:
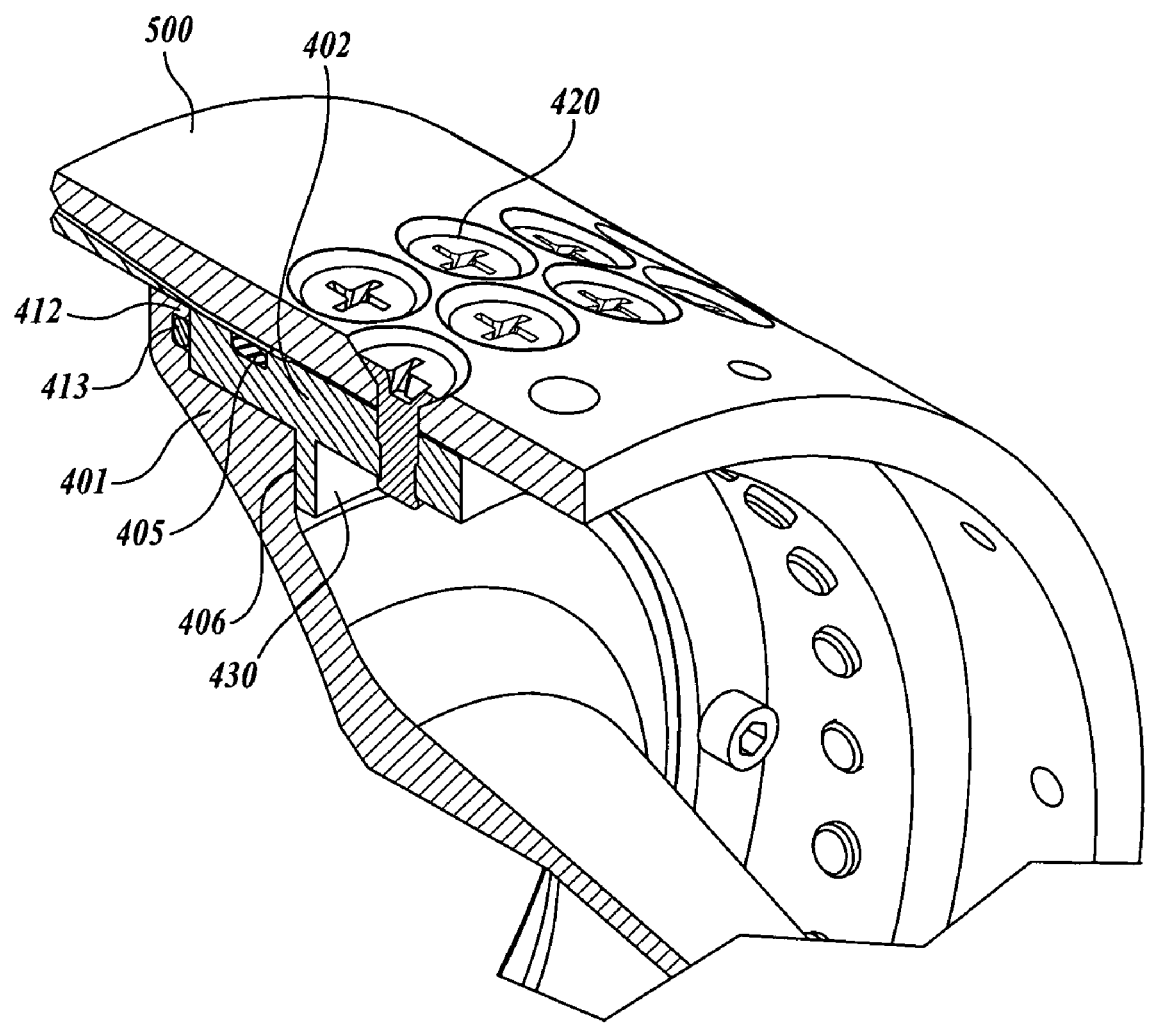
FIG. 21 is a close-up isometric rear view illustration of the two-piece aft closure assembly shown in FIG. 20.

In FIGS. 20 and 21, the retaining ring piece 402 of the third embodiment is shown attached to the distal end of a motor case 500 with a plurality of bolts 420 around the circumference of the retaining ring piece 402. However, it is to be realized that the first and second embodiments may also be attached to the motor case 500 in a similar manner. The retaining ring piece 402 outer diameter is substantially sized to be the same as or smaller than the inner diameter of the motor case 500 so that the retaining ring piece 402 is mounted inside the motor case 500. The retaining ring piece 402 is made from a material having substantially the same coefficient of thermal expansion as the motor case 500 in order to minimize relative motion between the motor case 500 and the retaining ring piece 402 due to thermal expansion. Steel and titanium are representative suitable materials for the retaining ring piece 402 and motor case 500; however, it should be appreciated that other materials can be used.

FIGS. 20 and 21 also show the plurality of holes placed around the circumference of the retaining ring piece 402 so that the retaining ring piece 402 is attached to the motor case 500 with fasteners 420 extending through the motor case 500 and engaging the holes in the retaining ring piece 402. The O-ring 405 is sized to maintain a radial seal, while allowing for relative motion between the motor case 500 and the retaining ring piece 402 due to loading and/or any differences between the coefficient of thermal expansion of the motor case 500 and the coefficient of thermal expansion of the retaining ring piece 402.

The face seal O-ring 413 disposed orthogonal to the radial O-ring 405 and placed in the groove 412 on the face of the flange 410 of the blast tube and closure piece 401 contacts the proximal face of the retaining ring piece 402 to provide a second seal between the blast tube and closure piece 401 and the retaining ring piece 402. Because the blast tube and closure piece 401 is made from a material that has a different coefficient of thermal expansion than the retaining ring piece 402, temperature changes will cause relative motion between the blast tube and closure piece 401 and the retaining ring piece 402 in a radial direction. Accordingly, the face seal O-ring 413 is sized so that a seal is maintained as the blast tube closure piece 401 moves radially relative to the retaining ring piece 402.

The blast tube and closure piece 401 is attached to the retaining ring piece 402 with fasteners arranged in a circumferential pattern so that the centerlines of the fasteners extend in a forward and aft direction. In addition to holding the retaining ring piece 402 and blast tube and closure piece 401 together, the fasteners pre-load the face seal O-ring 413, preventing motor gas leakage during the initial pressurization of the motor case 500. The fastener holes can be slotted in the blast tube and closure piece 401 or the retaining ring piece 402 to allow for the relative motion of the blast tube and closure piece 401 and the retaining ring piece 402 without excessively loading the fasteners, the blast tube and closure piece 401, and/or the retaining ring piece 402.

The embodiments of the two-piece aft closure assemblies 200, 300, and 400 use two inexpensive components having different coefficients of thermal expansion in place of a more expensive monolithic aft closure. The components are less expensive due to both lower material costs and less complex machining.

The use of the two-piece design is at a particular advantage in reducing the impact between near zero, CTE composite cases and high CTE, low weight materials such as aluminum. A two-piece steel and aluminum aft closure for a tactical motor would best be suited for pressures under 4500 psi, which is where most tactical motors operate.

While the preferred embodiment of the invention has been illustrated and described, it will be appreciated that various changes can be made therein without departing from the spirit and scope of the invention. For example, while the embodiments of the two-piece aft closure assemblies 200, 300, and 400 include a groove 212, 312, and 412 on the flange of the closure portion of the blast tube and closure pieces, it is possible to incorporate the groove in the proximal face of the retaining ring pieces instead. Additionally, a two-piece closure may find other applications in addition to rocket motor cases. Accordingly, the embodiments of the invention are not limited for use in motor cases only. For example, any pressure vessel experiencing extremes in temperature or benefiting from using different materials may incorporate a sealing system having orthogonal sealing surfaces—one for sealing radially and one for sealing circumferentially. Accordingly, in a broad embodiment of the invention, the two-piece closure includes a first and second seal, wherein one seal is for circumferentially sealing between the inside of a pressure vessel and a ring, and a second seal is for sealing the face of the ring and a closure at one end of the pressure vessel that is open to the exterior.

The embodiments of the invention in which an exclusive property or privilege is claimed are defined as follows:

1. A system for sealing a rocket motor case to an aft closure assembly, wherein the aft closure assembly comprises a retaining ring piece and a closure piece, comprising:
   (a) a retaining ring made from a material having a coefficient of expansion similar to the rocket motor case material, the retaining ring piece having a first seal to seal between an outer surface of the retaining ring and the inner surface of the rocket motor case; and
   (b) a closure made from a material having a coefficient of expansion different to the coefficient of expansion of the retaining ring, the closure stationarily connected to a fixed location on the retaining ring, the closure having a second seal to seal between the closure and a face of the retaining ring;
   (c) wherein the face of the retaining ring that is sealed by the second seal is orthogonal to the outer surface of the retaining ring.

2. The system of claim 1, further comprising means for connecting the retaining ring to the closure.

3. The system of claim 1, wherein the retaining ring is generally circular, and the first seal seals the outer circumference of the retaining ring to the rocket motor case.

4. The system of claim 1, wherein the closure includes an aperture that provides an opening from the interior of the rocket motor case to the exterior.

5. The system of claim 1, wherein the retaining ring is made from a material having a first coefficient of thermal expansion, and the closure is made from a material having a second coefficient of thermal expansion that is greater than the first coefficient of thermal expansion.

6. The system of claim 1, wherein the retaining ring is made from a material that is similar to the material of the rocket motor case.

7. The system of claim 1, wherein the rocket motor case is made from a material having a first coefficient of thermal expansion, and the closure is made from a material having a second coefficient of thermal expansion that is greater than the first coefficient of thermal expansion.

8. The system of claim 1, wherein the closure is made from a material that is lighter in weight than the material of the rocket motor case.

9. The system of claim 1, wherein the closure is made from a material that is lighter in weight than the material of the retaining ring.

10. The system of claim 1, wherein the rocket motor case is made from a material that is stronger than the material of the closure.

11. The system of claim 1, wherein the retaining ring is made from a material that is stronger than the material of the closure.

12. The system of claim 1, wherein the retaining ring is made from titanium, steel, alloys of titanium, alloys of steel, or any combination thereof.

13. The system of claim 1, wherein the closure is made from aluminum, alloys of aluminum, or any combination thereof.

14. The system of claim 1, wherein the closure partially closes an end of the rocket motor case and is a separate component from the rocket motor case.

15. The system of claim 1, wherein the first and the second seals comprise an O-ring.

16. A motor case for a rocket engine, comprising the system for sealing of claim 1.

17. A rocket engine, comprising a motor case and the system for sealing of claim 1.

18. The system of claim 1, wherein the second seal is maintained as the closure moves radially relative to the retaining ring.

19. A system for sealing a rocket motor case, comprising a retaining ring inside the rocket motor case, the retaining ring having a proximal end and a distal end, a radial seal to seal between an inside surface of the rocket motor case and the retaining ring, and a closure having a face seal to seal between a distal facing surface of the closure and a proximal facing surface at the proximal end of the retaining ring, the closure connected to a fixed location on the retaining ring, wherein the face seal is maintained as the closure moves relative to the retaining ring.

20. The system of claim 19, wherein the rocket motor case has an inner diameter and the closure has about the same or smaller outer diameter so that the closure is fitted within the inner diameter of the rocket motor case.

21. The system of claim 19, wherein the rocket motor case has an inner diameter and the retaining ring has about the same or smaller outer diameter so that the retaining ring is fitted within the inner diameter of the rocket motor case.

22. The system of claim 19, wherein the retaining ring has a length greater than its thickness and a groove around its outer circumference and an O-ring in the groove.

23. The system of claim 19, wherein the retaining ring has an inner and an outer diameter and a surface annulus at the proximal and distal end.

24. The system of claim 23, wherein the closure has a circular flange at one end of the closure, wherein the face of the circular flange faces the surface annulus at the proximal end of the retaining ring, and the flange includes a groove around the face of the flange and an O-ring in the groove.

25. The system of claim 19, wherein the closure includes an aperture that provides an opening from the interior of the rocket motor case to the exterior.

26. An aft closure assembly for a rocket motor case, comprising:
   (a) a retaining ring piece inside the rocket motor case and having a first seal around the outer circumference that seals against an inner circumference of the rocket motor case, the retaining ring piece stationarily attached to the motor case; and
   (b) an aft closure piece comprising a blast tube, the closure piece stationarily attached to the retaining ring piece and having a second seal on a face of the retaining ring piece to seal between the retaining ring piece and the closure piece, wherein the rocket motor case is open to the exterior via the blast tube.

27. A system for sealing a rocket motor case having an opening, comprising:

(a) a retaining ring on the inside of the rocket motor case to seal between the rocket motor case and the retaining ring; and (b) a closure connected to the retaining ring, the closure having a surface orthogonal to the outside circumference of the retaining ring to seal between an end face of the retaining ring and the orthogonal surface, wherein the orthogonal surface contacts the end face and is configured to move radially relative to the end face of the retaining ring, and wherein the closure includes an aperture that provides an opening from the interior of the rocket motor case to the exterior.

28. An aft closure assembly for a rocket motor case, comprising:

(a) a retaining ring piece inside the rocket motor case having a first seal to seal between an outer surface of the retaining ring piece and an interior surface of a rocket motor case, wherein the first seal is maintained as the retaining ring moves relative to the rocket motor case and the retaining ring piece is stationarily attached to the motor case; and (b) an aft closure piece comprising a blast tube, the closure piece stationarily connected to a fixed location on the retaining ring piece, the closure piece having a distal face formed by a circular flange at the proximal end thereof, the distal face having a second seal to seal between the distal face and a proximal end face of the retaining ring, the proximal end face of the retaining ring in contact with the distal face of the closure piece;

(c) wherein the proximal end face of the retaining ring piece that is sealed by the second seal is orthogonal to the outer surface of the retaining ring piece, and the second seal is maintained as the closure piece moves radially relative to the retaining ring piece; and (d) wherein the retaining ring piece is made from a material having a first coefficient of thermal expansion similar to the rocket motor case material, and the closure piece is made from a material having a second coefficient of thermal expansion that is different than the first coefficient of thermal expansion.

* * * * *